US008620705B2

(12) United States Patent
Peterson et al.

(10) Patent No.: US 8,620,705 B2
(45) Date of Patent: Dec. 31, 2013

(54) METHOD OF CONNECTING DIFFERENT LAYERS OF OPTIMIZATION

(75) Inventors: Tod J. Peterson, Billings, MT (US); William P. Snow, Fairfax, VA (US); John R. Hind, Williamstown (AU); Kiran R. Sheth, Sugar Land, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/236,137

(22) Filed: Sep. 19, 2011

(65) Prior Publication Data

US 2012/0071991 A1 Mar. 22, 2012

Related U.S. Application Data

(60) Provisional application No. 61/384,905, filed on Sep. 21, 2010.

(51) Int. Cl.
*G06Q 10/00* (2012.01)

(52) U.S. Cl.
USPC ............................................ 705/7.11; 700/28

(58) Field of Classification Search
USPC ............................ 705/7.11–7.42; 700/28–51
See application file for complete search history.

(56) References Cited

U.S. PATENT DOCUMENTS

| | | | | |
|---|---|---|---|---|
| 5,740,033 | A * | 4/1998 | Wassick et al. | 700/29 |
| 6,278,899 | B1 * | 8/2001 | Piche et al. | 700/44 |
| 6,381,504 | B1 * | 4/2002 | Havener et al. | 700/44 |
| 6,950,711 | B2 * | 9/2005 | Havener et al. | 700/28 |
| 7,330,767 | B2 * | 2/2008 | Thiele et al. | 700/29 |
| 7,376,472 | B2 * | 5/2008 | Wojsznis et al. | 700/29 |
| 7,797,063 | B2 * | 9/2010 | Hall et al. | 700/44 |
| 8,046,089 | B2 * | 10/2011 | Renfro et al. | 700/30 |
| 2003/0014131 | A1 * | 1/2003 | Havener et al. | 700/29 |
| 2003/0018399 | A1 * | 1/2003 | Havener et al. | 700/28 |
| 2006/0193295 | A1 * | 8/2006 | White et al. | 370/336 |
| 2008/0077257 | A1 * | 3/2008 | Peterson et al. | 700/34 |
| 2009/0157590 | A1 * | 6/2009 | Mijares et al. | 706/61 |
| 2012/0245748 | A1 * | 9/2012 | Kumar et al. | 700/288 |

FOREIGN PATENT DOCUMENTS

| | | | | |
|---|---|---|---|---|
| WO | WO 2007067645 A2 * | 6/2007 | | G05B 13/04 |
| WO | WO 2008055209 A2 * | 5/2008 | | G05B 13/04 |

OTHER PUBLICATIONS

Qin et al. (S. Joe Qin; Thomas A Badgwell; "A survey of industrial model predictive control technology"; Control Engineering Practice 11 (2003) 733-764; Received Nov. 8, 2001; accepted Aug. 31, 2002; Retrieved from www.sciencedirect.com).*

Mayne et al. (D. Q. Mayne, J. B. Rawlings, C. V. Rao, P. O. M. Scokaert; "Constrained model predictive control: Stability and optimality"; Automatica 36 (2000) 789-814).*

Moritz et al. (Moritz Diehl, H. Georg Bock, Johannes P. Schloeder, Rolf Findeisen, Zoltan Nagy, Frank Allgoewer; "Real-time optimization and nonlinear model predictive control of processes governed by differential-algebraic equations"; Journal of Process Control 12 (2002) 577-585).*

Xiaotao et al. (Xiaotao Wan, Joseph F. Pekny, Gintaras V. Reklaitis; "Simulation-based optimization with surrogate models-Application to supply chain management"; Computers and Chemical Engineering 29 (2005) 1317-1328).*

* cited by examiner

*Primary Examiner* — Alan S Miller
(74) *Attorney, Agent, or Firm* — Ronald Hantman

(57) ABSTRACT

The present invention is a method for synchronizing multiple layers of constrained optimization with both layers having some common variables in a to processing plant. The layers of optimization can include Planning, Scheduling, Real-Time Optimization and Model Predictive Control.

6 Claims, 2 Drawing Sheets

Steps to Synchronize Two Optimization Layers

Hierarchy of Optimization Layers

Steps to Synchronize Two Optimization Layers

METHOD OF CONNECTING DIFFERENT LAYERS OF OPTIMIZATION

This application claims the benefit of U.S. Provisional Application No. 61/384,905 filed Sep. 21, 2010.

BACKGROUND OF THE INVENTION

Modern processing plants often have many different layers of optimization, which can include Model Predictive Control, Real-Time Optimization, Planning and Scheduling. The current invention relates to a tighter synchronization of these layers of optimization.

Model Predictive Control (MPC) are a class of algorithms that use a simplified dynamic model to predict the dependent variables (i.e., outputs) of a dynamical system with respect to changes in the process independent variables (i.e., inputs), and to move the process independent variables in a more optimal fashion. The steady-state targets for the independent variables are often determined by an economic objective function. Frequency of execution is on the order of minutes or seconds.

Real-time optimization (RTO) are a class of algorithms that use more rigorous process models and economics to find more complicated optima which are difficult or impossible to find using the simplified models from Model Predictive Control. Usually, the economics are updated more regularly than MPC. Frequency of execution is on the order of hours.

Scheduling programs use a model of the process facility to represent individual unit capabilities, capacities and constraints. An optimizer is used to calculate the timing and disposition of available feeds and products. Frequency of execution is on the order of days or weeks.

Planning programs use a model of a process facility, or even multiple processing facilities, to represent production capabilities and constraints. An optimizer is used to calculate optimal feedstock procurement, sales strategy and facilities' utilization. Frequency of execution is on the order of weeks or months.

In general, multiple layers of optimization are used in a hierarchical manner, with results from higher layers sent down as "targets" to lower layers (see FIG. 1). Sometimes shadow values (sensitivity of the economic objective function to changes in constraints) of a higher layer are used to help define the economic objective function(s) of lower layer(s). However, the programs in is different optimization layers are usually run by different people, sometimes in different organizations. The models, objective functions and optimization algorithms can be different, even though they contain common variables. Since higher-level optimization programs are executed at lower frequencies, the targets calculated by an upper layer will become further away from the true optimum when there are process changes or disturbances between upper layer execution cycles.

The present invention is a method to more tightly synchronize the objective functions of different layers of optimization. It is a general technique that allows different layers with different model types, objective functions, solution types or computing platforms to work toward the same objective. Its innovation is the ability to pass the objectives between layers, rather than just the targets. It can be done manually or automatically with a computer program.

SUMMARY OF THE PRESENT INVENTION

The present invention is a method for reconciling the optimizers of two different layers of optimization, with each layer having a model of the process, and an optimizer with cost sensitivity analysis. The method includes the following steps: a) identifying the active constraints and associated shadow values (cost sensitivities) in the upper optimization layer, b) finding a set of exact and/or approximate matching variables in the lower optimization layer that closely represent the set of upper level optimizer constraints, c) using the model to from the lower level optimizer to solve for the economic inputs that push the process to the chosen set of lower level optimizer constraints, and d) identifying and using targets for variables and values which cannot be reached using only the lower-level optimization economics (see FIG. 2).

DESCRIPTION OF THE PREFERRED EMBODIMENT

Figure 1:
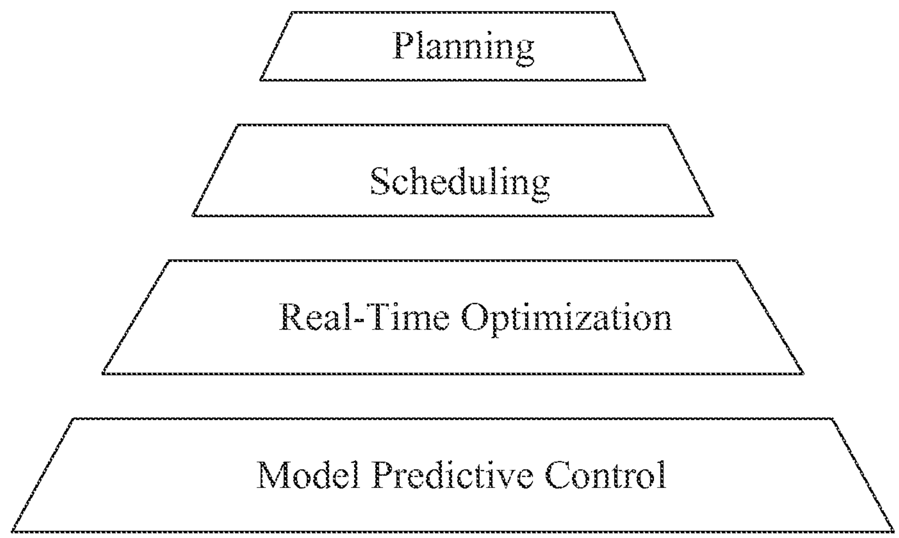
FIG. 1 is a schematic diagram showing the typical hierarchy of Planning, Scheduling, Real-Time Optimization and Model Predictive Control.
Figure 2:
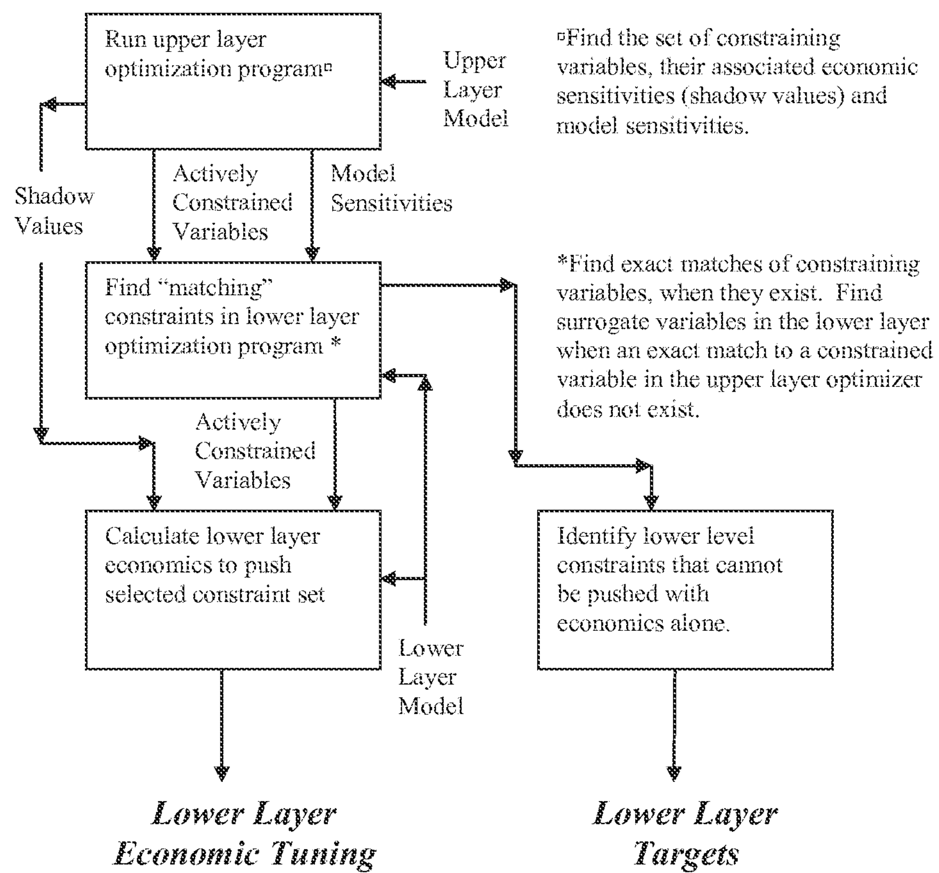
FIG. 2 is a flow chart showing the steps of the method of the present invention.

The present invention is a method to connect different layers of optimization in a processing facility so that the economic drivers of both layers are pushing the process in the same direction. Targets for values of variables in the lower optimization layer are defined only for those variables which cannot be reached be reached using economic factors.

Optimization programs often have some type of sensitivity analysis capability built into the software. A shadow value is a common output from sensitivity analysis—it quantifies the partial derivative of the economic objective function to changes in the value of a constraint. Shadow values are the result of the model, the state of the process and the economic objective function. Shadow values can be calculated for any constrained variable in an optimization program.

In order for two optimization programs to be synchronized, both programs should have the same set of active constraints, for variables which are common to both models. Simply using the shadow values of an upper level optimizer to define the economics for a lower-level optimizer is appealing at first thought. However, if the models in both optimizers are not identical, the "same" economics can result in a different set of actively constrained variables in the general case.

In the preferred embodiment of this invention, the linkage between optimization layers is done by calculating economics in the lower layer optimizer to push the lower level optimizer to an identical, or nearly identical set of active constrained variables as the upper level optimizer. Targets, or enforced limits, on lower optimization layer values are used only when those variables cannot be driven to the optimum limit using economics alone.

Variables which exist in both optimization layers, and are actively constrained in the upper layer, are chosen to be constrained in the lower layer. When an active constraint in the upper optimization layer does not exist in the lower optimization layer, an acceptable substitute, or surrogate, needs to be chosen to represent the upper level constraint. A weighted dot product of model sensitivities is the basic calculation used for this purpose.

For the purpose of surrogate constraint selection, model sensitivity vectors are calculated for unmatched upper optimization layer constraints and all potential lower optimization layer surrogates. All sensitivity vectors in both layers are calculated against the same set of independent variables.

These sensitivity vectors are optionally multiplied by some kind of independent weighting factors.

The dot product, also known as the scalar product, is an operation which takes two vectors over the real numbers R and returns a real-valued scalar quantity. The dot product of two vectors $a=[a_1, a_2, \ldots, a_n]$ and $b=[b_1, b_2, \ldots, b_n]$ is by definition:

$$a \cdot b = \sum_{i=1}^{n} a_i b_i = a_1 b_1 + a_2 b_2 + \ldots + a_n b_n$$

where Σ denotes summation notation.

In Euclidean geometry, the dot product, $$a \cdot b = |a||b|\cos\theta,$$

Or $$\cos\theta = \left(\frac{a \cdot b}{|a||b|}\right)$$

Where |a| and |b| denote the length of a and b, and θ is the angle between them.

For a vector a, $$|a| = \sqrt{a \cdot a}$$

For the purposes of this invention, cos θ is the normalized, weighed dot product $a=[a_1, a_2, \ldots, a_n]$ is the vector of sensitivities of dependent variable a, to independent variables 1–n, multiplied by optional weighting factors.

$b=[b_1, b_2, \ldots, b_n]$ is the vector of sensitivities of dependent variable b, to independent variables 1–n, multiplied by optional weighting factors.

The dot product is used for two purposes, 1) to find the variables that most closely represent the unmatched upper optimization level constraint and 2) verify that the chosen constraint is not too similar to lower optimization level variables already chosen as constrained.

To find the best surrogate candidates for upper optimization layer unmatched variables, the dot products between the weighted sensitivity vector of an unmatched dependent variable in the upper optimization layer and the sensitivity vectors of all unmatched, potential surrogate variables in the lower optimization layer are calculated. The lower optimization layer dependent variables are sorted based on their dot products, with higher dot products representing better matches.

The dot product is then calculated between the weighted sensitivity of the best match in the lower layer and all other lower optimization layer variables already chosen as constraints. For this purpoe, a higher dot product is less desirable, since it represents similarity, or collinearity with existing constraints. If none of the dot products exceed the user-defined collinearity threshold, then this variable is chosen as a surrogate. If any of the dot products exceed the user-defined collinearity threshold, then that variable is rejected and the next best match is tested. This process continues until a suitable surrogate is selected.

Once a suitable set of lower level constraints is chosen and finalized, the next step is to choose a set of lower optimization layer economic tuning parameters that will cause the optimizer to push the process to that set of selected constraints.

Normally, an optimization program user will define the model and the economics, and the program will find the set of active constraints and calculate the economic sensitivities (shadow values) for the active constraint set. In the preferred embodiment for this invention, the process is reversed. The set of active constraints for the lower optimization layer is calculated based on upper optimization results, as per the above description. Then shadow values are assigned to these constrained variables, based on the economic sensitivity analysis of the upper layer. Finally, lower level optimization layer economics are calculated to push the desired set of constraints, with the defined set of shadow values, using the lower optimization layer model.

The example formula for steady state cost calculation, where costs are only assigned to lower optimization layer, linear, independent variables, is the following:

$$Cost_i = -\left(ISV_i + \sum_{j=1}^{j=n} G_{ij} DSV_j\right)$$

Where:

$Cost_i$ is the calculated economic cost for lower optimization layer objective function $G_{ij}$ is the sensitivity (gain) of the lower optimization layer dependent variable j, to independent variable i.

$ISV_i$ is the shadow value of the independent variable i $DSV_j$ is the shadow value of the dependent variable j n=number of constrained dependent variables in the lower optimization problem The formula may be obtained from the following:

$$\Delta \underline{CV} = [G]\Delta \underline{MV}$$

$$\Delta\text{Objective} = -\underline{\text{Cost}} \cdot \Delta \underline{MV}$$

also:

$$\Delta\text{Objective} = \underline{MVSV} \cdot \Delta \underline{MV} + \underline{CVSV} \cdot \Delta \underline{CV}$$

$$\therefore \underline{-\text{Cost}} \cdot \Delta \underline{MV} = MVSV \cdot \Delta \underline{MV} + \underline{CVSV} \cdot \Delta \underline{CV}$$

$$\therefore \underline{-\text{Cost}} \cdot \Delta \underline{MV} = \underline{MVSV} \cdot \Delta \underline{MV} + \underline{CVSV} \cdot [G]\Delta \underline{MV}$$

$$\therefore \underline{-\text{Cost}} = \underline{MVSV} + [G]^T \underline{CVSV}$$

or, $$\therefore Cost_i = -\left(MVSV_i + \sum_{j=1}^{j=n} G_{ij} CVSV_j\right)$$

The shadow value is assigned a negative value if the active constraint is a lower limit and positive value if the constraint is an upper limit.

Normally, the shadow values from the upper layer are used unchanged for the constrained variables on the lower optimization layer that are directly matched. However, it is possible to scale shadow values for surrogate variables on the lower layer based on ratio of the norms of the sensitivity vectors. It is also possible to get the same desired solution by scaling all shadow values by an equal factor.

The formula would be different if the MPC objective function were expressed in terms of values instead of costs, or if costs/values could be applied to dependent (controlled) variables also. However, the objective of this step is independent of the particular objective function of the lower optimization layer. The objective is to calculate lower layer economics such that the controller will push the designated constraints with the desired economic sensitivity (shadow costs).

Ideally, we would push all the desired constraints with economics only. However, there are times when the difference between limits and optimization functions makes that impossible. The preferred embodiment of this invention utilizes numerical targets for those constraints that cannot be pushed with economic tuning alone. Two examples are presented, one for different limits, and one for different optimization functions.

Ideally, the same constrained variable, represented in two different optimization layers, has the same upper and lower limits. In the general case, however, it is possible that the upper optimization layer has more restricted limits than the lower optimization layer. If that is the case, the calculated economics in the lower will potentially push the process beyond the limits specified in the upper optimization layer. To avoid that problem, a target on the lower optimization layer is set equal to the more restrictive value of the upper optimization layer.

Sometimes an upper optimization layer is capable of finding more complicated optimum points that cannot be replicated on a lower layer optimizer. For example, a quadratic program in a real-time optimizer may find a peak optimum, a point of economic tradeoff where the profit decreases if it moves in either direction. If the lower optimization layer, a model predictive controller for example, has a linear program optimizer, it will not be able to recognize, calculate or drive to peak optima. A numerical target is set equal to the peak optimum value on the lower layer to account for this problem.

optimizer, which is good for pushing the process against constraints, but is unable to recognize or stop at peak optima.

The controller's manipulated (independent) and controlled (dependent) variables, along with current values and upper/lower limits, are listed in Table-1 below.

TABLE 1

MPC Configuration and State Information

| Variable | Manipulate (MV)/ Controlled (CV) | Value | Lower Limit | Upper Limit |
|---|---|---|---|---|
| FEED FLOW | MV | 150 | 100 | 180 |
| REFLUX | MV | 50 | 30 | 80 |
| COLUMN PRESSURE | MV | 197 | 180 | 238 |
| BOTTOM TEMP | MV | 125 | 120 | 160 |
| STEAM VALVE | CV | 65 | 10 | 90 |
| PUMP AMP | CV | 230 | 0 | 260 |
| PRESSURE VALVE | CV | 35 | 10 | 90 |
| BOTTOM IMPURITY | CV | 1 | 0.1 | 2 |
| TOP IMPURITY | CV | 2 | 0.2 | 3 |
| TOWER DP | CV | 20 | 0 | 28 |
| TOP TRAY TEMP | CV | 100 | 92 | 110 |

The MPC has a set of sensitivities, or gains, relating changes in the controlled variables (CVs) to changes in the manipulated variables (MVs). This matrix of gains (G) is shown in Table-2 below. Using these gains and user-defined economics, MPC computes directional setpoints and combination of manipulated variable values to achieve them.

TABLE 2

Raw MPC Gains (G)

| | | MPC CVs | | | | | | |
|---|---|---|---|---|---|---|---|---|
| | MPC GAINS | STEAM VALVE | PUMP AMP | PRESSURE VALVE | BOTTOM IMPURITY | TOP IMPURITY | TOWER DP | TOP TRAY TEMP |
| MPC MVs | FEED FLOW | 0.4 | 0.3 | | 0.02 | 0.08 | 0.4 | 0.2 |
| | REFLUX | 0.22 | | 1.5 | -0.04 | -0.25 | 1.3 | -2.1 |
| | COLUMN PRESSURE | | 0.02 | -4.7 | 0.22 | -0.11 | -0.08 | 0.07 |
| | BOTTOM TEMP | 0.1 | | | -0.5 | 0.3 | 0.2 | 0.44 |

EXAMPLE

Real-Time Optimization and Model Predictive Control Applied to a Distillation Column In this example a multivariable process controller (MPC) and a real-time optimizer (RTO) are used to control and optimize a simple distillation column. The RTO application uses a sophisticated, sequential quadratic program (SQP) optimizer to find a global optimum operating point for the process. The optimum from the SQP can be against process constraints, or at peak optimum points between constraints, where the objective function loses profitability moving in either direction. The MPC has a simpler linear program (LP)

The RTO similarly has a set of sensitivities, or gains, relating changes in the controlled variables to changes in manipulated variables. Usually the RTO model is nonlinear, and the sensitivities are a local linearization that can change depending on the current state of the process. This matrix of gains (G') for a given linearization is shown in Table-3 below. Note that the RTO includes all of the variables in the MPC and some additional variables. Also, the matrix of gains (G') in the RTO need not be same as matrix of gains (G) in the MPC. Using these gains and true economics, RTO solves for the process optimum. The optimum set of constraints, and their economic sensitivity (shadow values), computed by RTO are displayed in the Table-4 below:

TABLE 3

Raw RTO Gains (G')

| | RTO CVs → | | | | | | | | |
|---|---|---|---|---|---|---|---|---|---|
| RTO MVs ↓ | RTO SENSITIVITY | STEAM VALVE | PUMP AMP | PRESSURE VALVE | BOTTOM IMPURITY (*) | TOP IMPURITY (*) | TOWER DP | TOP TRAY TEMP | CORROSION (*) |
| | FEED FLOW | 0.400 | 0.270 | | 0.021 | 0.085 | 0.400 | 0.184 | -0.121 |
| | REFLUX | 0.220 | | 1.500 | -0.033 | -0.282 | 1.300 | -2.510 | 1.442 |
| | COLUMN PRESSURE (*) | | 0.025 | -4.700 | 0.194 | -0.130 | -0.080 | 0.061 | -0.036 |
| | BOTTOM TEMP | 0.100 | | | -0.587 | 0.297 | 0.200 | 0.522 | -0.212 |

(*) Indicates optimum constraint

TABLE 4

Optimum Constraint Set

| CONSTRAINED VARIABLE | VARIABLE TYPE | In MPC? | CONSTRAINT TYPE | OPTIMUM VALUE | SHADOW VALUE |
|---|---|---|---|---|---|
| COLUMN PRESSURE | MV | Y | LOWER | 195.5 | −23.7 |
| BOTTOM IMPURITY | CV | Y | UPPER | 2 | 412.2 |
| TOP IMPURITY | CV | Y | PEAK | 0.8 | 0 |
| CORROSION | CV | N | UPPER | 227 | 89.9 |

The first three constraints are variables which exist in both RTO and MPC layers, so we will choose these same three variables to be constrained also in the MPC layer. The CORROSION variable exists only in the RTO layer, so a suitable surrogate constraint must be chosen from among the MPC variables.

The weighted dot product is used evaluate potential surrogate constraints. In order to compute a dot-product, the two vectors must have same number of elements. That is straightforward for MPC CVs, since both sensitivity matrices, G and G' have the same set of MVs. However, it is also possible to evaluate MVs as potential surrogate constraints. To do this, we create shadow CVs for the MVs we wish to evaluate, with a unity (1.0) gain for the MV itself, and zero gains for all other elements. There is no need to evaluate the three constraints that are already chosen. The augmented matrix, showing the remaining unconstrained CVs and shadow CVs, is displayed in Table-5.

(Note: In this example, we evaluate potential surrogates by calculating the dot product with the gains in the MPC matrix. In another embodiment of this invention, potential surrogates can be evaluated by calculating the dot product with the gains in the RTO matrix, of variables which also exist in the MPC application.)

TABLE 5

Augmented Raw MPC Gains

| | | Shadow CVs ↔ | | | MPC CVs ↔ | | | | |
|---|---|---|---|---|---|---|---|---|---|
| MPC MVs ↓ | MPC GAINS | FEED FLOW | REFLUX | BOTTOM TEMP | STEAM VALVE | PUMP AMP | PRESSURE VALVE | TOWER DP | TOP TRAY TEMP |
| | FEED FLOW | 1 | | | 0.4 | 0.3 | | 0.4 | 0.2 |
| | REFLUX | | | | 0.22 | | 1.5 | 1.3 | -2.1 |
| | COLUMN PRESSURE | | 1 | | | 0.02 | -4.7 | -0.08 | 0.07 |
| | BOTTOM TEMP | | | 1 | 0.1 | | | 0.2 | 0.44 |

Since each manipulated variable represents a different physical quantity measured in different units, and has different range of allowable movement, the raw gain matrix is converted to a scaled gain matrix using a set of scaling factors. Table-6 below demonstrates use of "Typical Move Size" as scaling factors for STM VALVE vector from MPC gain matrix, and CORROSION vector from RTO gain matrix.

TABLE 6

| Scaled MPC and RTO Gains for Selected Pair of Variables | | | | | |
|---|---|---|---|---|---|
| VARIABLE | TYPICAL MOVE SIZE (A) | RAW MPC GAIN (B) (From Table-2 above) STM VALVE | SCALED MPC GAIN (C) = (A) * (B) STM VALVE | RAW RTO GAIN (B)' (From Table-3 above) CORROSION | Scaled RTO GAIN (C)' = (A) * (B)' CORROSION |
| FEED FLOW | 3 | 0.400 | 1.2 | −0.121 | −0.363 |
| REFLUX | 1 | 0.220 | 0.22 | 1.442 | 1.4422 |
| COLUMN PRESSURE | 25 | 0.000 | 0 | −0.036 | −0.9 |
| BOTTOM TEMP | 2 | 0.100 | 0.2 | −0.212 | −0.424 |

The dot-product of two vectors is the sum of the products of the individual elements of the two vectors. For the scaled STM VALVE and CORROSION vectors:

$$\text{STM VALVE}\cdot\text{CORROSION}=(1.2)(-0.363)+(0.22)(1.4422)+(0.0)(-0.0)+(0.2)(-0.424)=-0.2031$$

The 2-norm of the weighted vectors, denoted by |Name|, is calculated by taking the square root of the sum of the square of all the individual elements. For the scaled STM VALVE and CORROSION vectors:

$$|\text{STMVALVE}|=\sqrt{1.2^2+0.22^2+0.0^2+0.02^2}=1.236$$

$$|\text{CORROSION}| = \sqrt{(-0.363)^2+1.4422^2+(-0.9)^2+(-0.424)^2} = 1.789$$

Cosine of the angle between two vectors (normalized, weighted dot product) is computed by dividing the dot-product of two vectors with 2-norms of both vectors:

$$\text{COS(STM VALVE}\cdot\text{CORROSION})=-0.2031/(1.236*1.789)=-0.0918$$

Cosine of the angle closer to "1" or "−1" indicate that two vectors are very similar (1⇒ in the same direction; 1⇒ in the opposite direction), and hence, selected variable is the best surrogate for optimum constraint variable.

We calculate the weighted, normalized dot-product between the CORROSION variable and all other unmatched/unconstrained variables in the MPC. Results of this exercise are shown in Table-7 below:

TABLE 7

| 2-Norms and Dot Products of Various CVs with CORROSION | | |
|---|---|---|
| Variable | 2-norm (based on scaled MPC gains) | Cosine of the angle with CORROSION |
| FEED FLOW | 3 | −0.203 |
| REFLUX | 1 | 0.806 |
| BOTTOM TEMP | 2 | −0.237 |
| STM VALVE | 1.236 | −0.092 |
| PUMP AMP | 1.03 | −0.422 |
| PRESSURE VALVE | 117.5 | 0.513 |
| TOWER DP | 2.7 | 0.635 |
| TOP TRAY TEMP | 2.934 | −0.990 |

Based on these results, TOP TRAY TEMP is the best candidate as surrogate for CORROSION.

Although TOP TRAY TEMP is the unconstrained variable most similar to CORROSION, we want to verify that it is NOT too similar to other optimum constraint variables already chosen. We now calculate the dot-products between TOP TRAY TEMP and all other optimum constraint variables. Results of this exercise are presented in Table-8 below.

TABLE 8

| Dot-product of CVs in Optimum Constraint Set with Potential Surrogate (TOP TRAY TEMP) | | |
|---|---|---|
| Variable | Type | Cosine of the angle with TOP TRAY TEMP |
| COLUMN PRESSURE | MV | 0.597 |
| BOTTOM IMPURITY | CV | 0.540 |
| TOP IMPURITY | CV | −0.435 |

Since none of these dot products are too close to 1 or −1, we confirm TOP TRAY TEMP as the surrogate constraint for the "CORROSION" variable.

For CORROSION, the constraint type was UPPER. Since the cosine of the angle between CORROSION and TOP TRAY TEMP is negative, we target constraint type LOWER for TOP TRAY TEMP.

We now have the information we need for the "target" part of the algorithm. Our MPC layer is unable to find peak optimal points, so we put an UPPER and LOWER target of 0.8 on the peak optimum constraint TOP IMPURITY. We also put a LOWER target on the TOP TRAY TEMP at the value which corresponds to the CORROSION optimum value (97 in this example).

TABLE 9

| Algorithm Targets | | |
|---|---|---|
| Variable | Target Type | Value |
| TOP TRAY TEMP | Lower | 97 |
| TOP IMPURITY | Peak (Lower and Upper) | 0.8 |

We have chosen which constraints should be active in the MPC. The second part of the algorithm is to solve for the economic parameters in the MPC which push the desired constraints, with the desired shadow values.

The shadow values for the variables which exist in both layers will remain the same in the MPC layer as it was in the RTO layer. For the surrogate variable, we need to flip the sign, as a minimum, to account for the negative angle in the dot product. Optionally, we also choose to scale the shadow value according to the 2-norms of the two vectors in the equation below:

$$\text{TOP TRAY } TEMP_{ShadowValue} = CORROSION_{ShadowValue}\frac{|\text{CORROSION}|}{|\text{TOP TRAY TEMP}|} = -89.9\frac{1.789}{2.934} = -54.8$$

We now have all the information needed to calculate the MPC economic parameters listed in Table 10.

TABLE 10

Modified Optimum Constraint Set

| CONSTRAINED VARIABLE | VARIABLE TYPE | CONSTRAINT TYPE | OPTIMUM VALUE | SHADOW VALUE |
|---|---|---|---|---|
| COLUMN PRESSURE | MV | LOW | 195.5 | −23.7 |
| BOTTOM IMPURITY | CV | UPPER | 2 | 412.2 |
| TOP IMPURITY | CV | PEAK | 0.8 | 0 |
| TOP TRAY TEMP (as surrogate for CORROSION) | CV | LOWER | 97 | −54.8 |

For a MPC optimization layer, using a LP objective function, with costs assigned to manipulated variables only, the MPC economic drivers are calculated according to the formula below:

$$Cost_i = -\left(ISV_i + \sum_{j=1}^{j=n} G_{ij} DSV_j\right)$$

In this formula, $Cost_i$ is the cost associated with manipulated variable 'i', $ISV_i$ is the shadow value for manipulated variable 'i' (Table-9 above), $G_{ij}$ is gain of a controlled variable 'j' with respect to manipulated variable 'i' (Table-5 above), and $DSV_j$ the shadow value for controlled variable 'j' (Table-9 above).

As an example, cost for the COLUMN PRESSURE variable is calculated as:

$$Cost_i = -(-23.7 + 0.22*412.2 + (-0.11)*(0) + 0.07*(-54.8)) = -63.15$$

Results of repeating the process for all manipulated variables, are shown in the Table-11 below:

TABLE 11

Economic Drivers (Cost) for MVs in MPC

| Variable | Cost |
|---|---|
| FEED FLOW | 2.716 |
| REFLUX | −98.592 |
| COLUMN PRESSURE | −63.148 |
| BOTTOM TEMP | 230.212 |

Table 9 and Table 11 are the results of this algorithm. When these values are entered and simulated in the MPC application, it results in the MPC pushing the desired constraints, with the desired economic sensitivity (shadow values) exactly as listed in Table 10.

The normalized, weighted dot product can also be used to evaluate and compare the consistency of the models for variables which co-exist in multiple optimization layers. The normalized, weighted dot product of a vector of model sensitivities of a variable in an upper optimization layer with the vector of model sensitivities for the same variable in a lower optimization layer represents the angle between the two vectors. Ideally, this number would be exactly "1" if our models were perfectly consistent. The deviation from "1" is an indication of potential model problems in one or both layers.

Results of the normalized, weighted dot product for model checking are shown in Table 12 below:

TABLE 12

Model Consistency Check Using Dot Product

| Dependent Variable | Normalized Weighted Dot Product |
|---|---|
| STM VALVE | 1 |
| PUMP AMP | 0.988758075 |
| PRESSURE VALVE | 1 |
| BOTTOM IMPURITY | 0.998368982 |
| TOP IMPURITY | 0.999398415 |
| TOWER DP | 1 |
| TOP TRAY TEMP | 0.989908178 |

For this example, all the dot products are very close to "1". In a more realistic example, we may find dot products that are closer to zero, or even negative.

What is claimed is:

1. A method for synchronizing two different layers of constrained optimization, each layer having some common variables, which are jointly optimizing the operation of a processing plant by:

a. identifying the set of active constraints and associated shadow values (cost sensitivities) in the upper optimization layer, b. finding a set of exact and/or approximate matching variables in the lower optimization layer that closely represent the set of upper level optimizer constraints, wherein the lower optimization layer contains economic inputs, c. using a model from the lower optimization layer to solve for the economic inputs that push the process independent variables to the chosen set of lower optimization layer constraints, and d. identifying the process variable constraints which cannot be calculated by the lower optimization layer using only economic tuning alone, and fixing their values with numeric targets;

wherein the shadow values of the lower optimization layer constrained variables are assumed to have the same values as the corresponding shadow values in the upper optimization layer, and the lower optimization layer function is a linear program with defined with costs on independent variables only and the method for calculating lower optimization layer independent variable costs is defined by the following function:

$$Cost_i = -\left(ISV_i + \sum_{j=1}^{j=n} G_{ij} DSV_j\right)$$

where:

$Cost_i$ is the calculated economic cost for the lower optimization layer objective function $G_{ij}$ is the sensitivity (gain) of the lower optimization layer dependent variable j, to independent variable i $ISV_i$ is the shadow value of the independent variable i $DSV_j$ is the shadow value of the dependent variable j n=number of controlled variables in the lower optimization layer problem, where the shadow value is defined to be a negative value if the active constraint is a lower limit and positive value if the constraint is an upper limit; and wherein said method is utilized within a Model Predictive Control (MPC) system or a Real-Time Optimization (RTO) system to optimize the operation of said processing plant.

2. The method of claim 1 wherein unmatched constrained variables in the upper optimization layer are matched with potential surrogate variables in the lower optimization layer by calculating the weighted dot products between a vector of model sensitivities of the unmatched variable in the upper optimization layer and vectors of model sensitivities of potential surrogate variables in the lower optimization layer, using the same set of independent variables, for both optimization layers.

3. The method of claim 1 wherein unmatched constraint variables in the upper optimization layer are matched with potential surrogate variables in the lower optimization layer by calculating the weighted dot products between a vector of model sensitivities of the unmatched variable in the upper optimization layer and vectors of model sensitivities of other vectors in the upper optimization layer which also exist in the lower optimization layer.

4. The method of claim 1 wherein the upper layer of optimization is a Planning or Scheduling program and the lower optimization layer is a Model Predictive Controller.

5. The method of claim 1 wherein the upper layer of optimization is a Planning or Scheduling program and the lower optimization layer is a Real-Time Optimizer.

6. The method of claim 1 wherein the upper layer of optimization is real-time optimization and the lower layer of optimization is a Model Predictive Controller.

* * * * *